United States Patent
Dean et al.

(10) Patent No.: US 7,953,258 B2
(45) Date of Patent: May 31, 2011

(54) FINGERPRINT SENSING CIRCUIT HAVING PROGRAMMABLE SENSING PATTERNS

(75) Inventors: Gregory Lewis Dean, Phoenix, AZ (US); Richard Alexander Erhart, Tempe, AZ (US); Jaswinder Jandu, Chandler, AZ (US); Erik Jonathon Thompson, Phoenix, AZ (US)

(73) Assignee: Validity Sensors, Inc., San Jose, CA (US)

( * ) Notice: Subject to any disclaimer, the term of this patent is extended or adjusted under 35 U.S.C. 154(b) by 631 days.

(21) Appl. No.: 12/098,364

(22) Filed: Apr. 4, 2008

(65) Prior Publication Data

US 2009/0252384 A1   Oct. 8, 2009

(51) Int. Cl.
*G06K 9/28* (2006.01)
(52) U.S. Cl. ...................................... 382/124
(58) Field of Classification Search .................. None
See application file for complete search history.

(56) References Cited

U.S. PATENT DOCUMENTS

| | | | | |
|---|---|---|---|---|
| 5,569,901 A | * | 10/1996 | Bridgelall et al. | 235/470 |
| 6,898,299 B1 | * | 5/2005 | Brooks | 382/115 |
| 2004/0136612 A1 | * | 7/2004 | Meister et al. | 382/299 |
| 2007/0031011 A1 | * | 2/2007 | Erhart et al. | 382/124 |
| 2007/0076951 A1 | * | 4/2007 | Tanaka et al. | 382/181 |
| 2008/0175450 A1 | * | 7/2008 | Scott | 382/124 |

* cited by examiner

*Primary Examiner* — Brian P Werner
(74) *Attorney, Agent, or Firm* — Greenberg Traurig LLP; Cecily Anne O'Regan; William A. Furman

(57) ABSTRACT

A fingerprint sensor with programmable sensing patterns is disclosed in one embodiment of the invention as including a fingerprint sensing circuit having multiple I/O interconnects. The I/O interconnects are configured to sequentially drive a plurality of fingerprint sensing elements. A memory device may be operably coupled to the fingerprint sensing circuit. A programmable data structure, such as a table, file, character string, numeric value, array, or the like may be stored in the memory device to designate a pattern for driving the fingerprint sensing elements. The fingerprint sensing circuit is configured to drive the fingerprint sensing elements according to the designated pattern. In selected embodiments, the fingerprint sensing elements may include transmitting elements, receiving elements, or a combination thereof.

20 Claims, 8 Drawing Sheets

FINGERPRINT SENSING CIRCUIT HAVING PROGRAMMABLE SENSING PATTERNS

BACKGROUND

This invention relates to fingerprint sensing technology and more particularly to fingerprint sensing circuits that can be programmed with different sensing patterns.

Fingerprint sensing technology is increasingly recognized as a reliable, non-intrusive way to verify individual identity. Fingerprints, like various other biometric characteristics, are based on unalterable personal characteristics and thus are believed to be more reliable when identifying individuals. The potential applications for fingerprints sensors are myriad. For example, electronic fingerprint sensors may be used to provide access control in stationary applications, such as security checkpoints. Electronic fingerprint sensors may also be used to provide access control in portable applications, such as portable computers, personal data assistants (PDAs), cell phones, gaming devices, navigation devices, information appliances, data storage devices, and the like. Accordingly, some applications, particularly portable applications, may require electronic fingerprint sensing systems that are compact, highly reliable, and inexpensive.

Various electronic fingerprint sensing methods, techniques, and devices have been proposed or are currently under development. For example, optical and capacitive fingerprint sensing devices are currently on the market or under development. Like a digital camera, optical technology utilizes visible light to capture a digital image. In particular, optical technology may use a light source to illuminate an individual's finger while a charge-coupled device (CCD) captures an analog image. This analog image may then be converted to a digital image.

There are generally two types of capacitive fingerprint sensing technologies: passive and active. Both types of capacitive technologies utilize the same principles of capacitance to generate fingerprint images. Passive capacitive technology typically utilizes an array of plates to apply an electrical current to the finger. The voltage discharge is then measured through the finger. Fingerprint ridges will typically have a substantially greater discharge potential than valleys, which may have little or no discharge.

Active capacitive technology is similar to passive technology, but may require initial excitation of the epidermal skin layer of the finger by applying a voltage. Active capacitive sensors, however, may be adversely affected by dry or worn minutia, which may fail to drive the sensor's output amplifier. By contrast, passive sensors are typically capable of producing images regardless of contact resistance and require significantly less power.

One feature common to each of the above fingerprint-sensing technologies is that they typically use arrays of fingerprint sensing elements, or "pixels," to sense a fingerprint. For example, optical technology may use an array of solid state pixels (e.g., a charge-coupled device) to detect a fingerprint, whereas capacitive technology may use an array of capacitive-type sensors, or "pixels." Each of these pixels may interface with a fingerprint sensing circuit (e.g, a fingerprint-sensing IC) using pins, leads, or other interconnects. In certain cases, the pixels that are used for scanning, as well as the scanning sequence of the pixels, is fixed or difficult to change after the fingerprint-sensing circuit is designed and implemented. In certain cases, the pixels and their sequence may depend on which interconnects they connect to. This characteristic may limit the flexibility of the fingerprint sensing circuit.

Accordingly, it would be an advance in the art to provide a fingerprint sensing circuit with greater flexibility. Ideally, the sensing pattern of a fingerprint sensing circuit could be programmed to include different pixels or sequences of pixels. Such flexibility may allow a fingerprint-sensing circuit to be tailored to different applications or allow fingerprint sensing circuits to be optimized or improved after they have been designed and implemented.

BRIEF DESCRIPTION OF THE DRAWINGS

In order that the advantages of the invention will be readily understood, a more particular description of the invention briefly described above will be rendered by reference to specific examples illustrated in the appended drawings. Understanding that these drawings depict only typical examples of the invention and are not therefore to be considered limiting of its scope, the invention will be described and explained with additional specificity and detail through the use of the accompanying drawings, in which.

DETAILED DESCRIPTION

Figure 1:
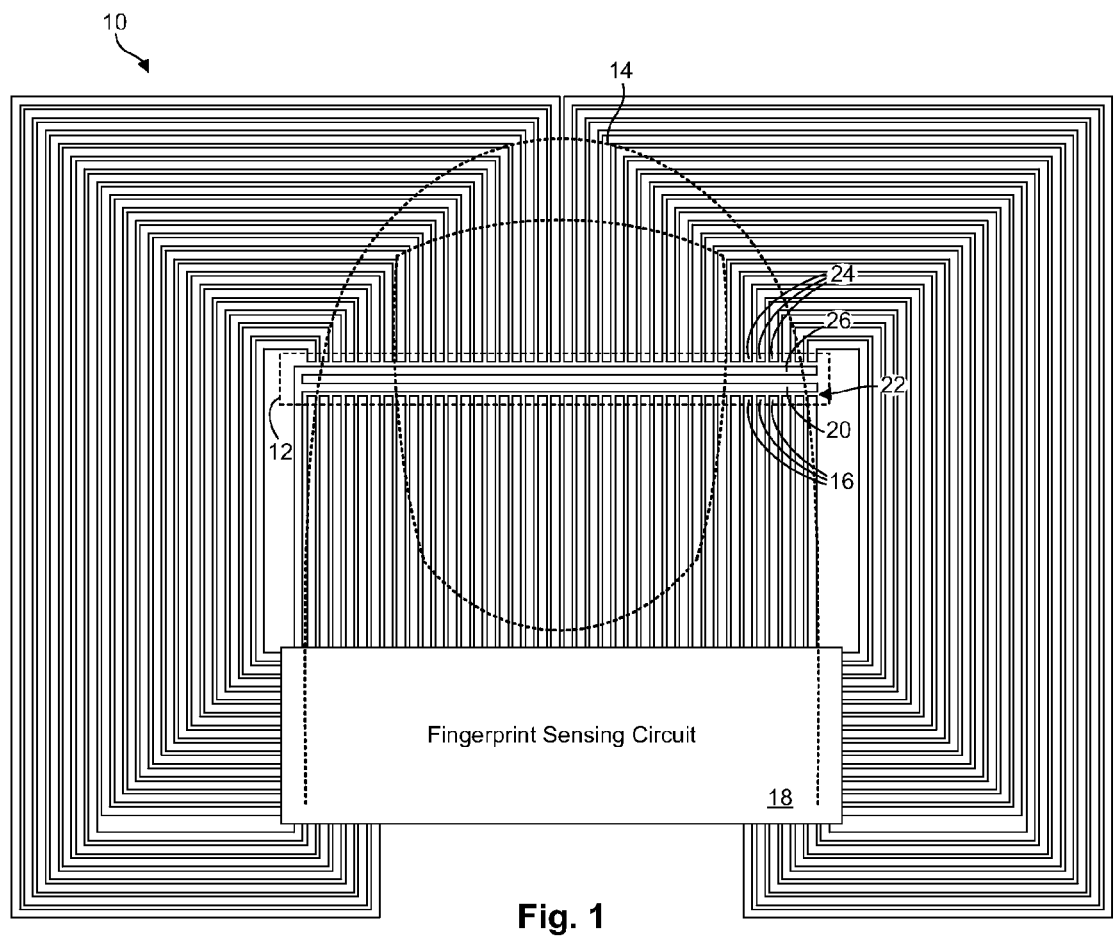
FIG. 1 is a high-level block diagram of one embodiment of a fingerprint sensing area containing an array of fingerprint sensing elements and interfacing with a fingerprint sensing circuit.

The invention has been developed in response to the present state of the art, and in particular, in response to the problems and needs in the art that have not yet been fully solved by currently available fingerprint sensors. Accordingly, the invention has been developed to provide fingerprint sensing circuits with programmable sensing patterns. The features and advantages of the invention will become more fully apparent from the following description and appended claims and their equivalents, and also any subsequent claims or amendments presented, or may be learned by practice of the invention as set forth hereinafter.

Consistent with the foregoing, a fingerprint sensor with programmable sensing patterns is disclosed in one embodiment of the invention as including a fingerprint sensing circuit having multiple I/O interconnects. The I/O interconnects are configured to sequentially drive a plurality of fingerprint sensing elements (e.g., transmitting and/or receiving elements). A memory device is operably coupled to the fingerprint sensing circuit. A programmable data structure, such as a table, file, character string, numeric value, array, or the like is stored in the memory device and is configured to designate a pattern for driving the fingerprint sensing elements. The fingerprint sensing circuit is configured to drive the fingerprint sensing elements according to the designated pattern. In selected embodiments, the fingerprint sensing elements may include transmitting elements, receiving elements, or a combination thereof.

In certain embodiments, the programmable data structure may include entries associated with each timeslot in the pattern. The entries may identify I/O interconnects used for transmitting and receiving during each timeslot, analog settings associated with each timeslot, digital settings associated with each timeslot, indices uniquely identifying each timeslot, or the like. In certain embodiments, the entries may identify a zone associated with each timeslot. The zone may be associated with settings to be used with all entries belonging to the zone.

In another embodiment in accordance with the invention, a method for programming a fingerprint sensor with different sensing patterns may include providing a fingerprint sensing circuit having multiple I/O interconnects. The I/O interconnects may be configured to sequentially drive multiple fingerprint sensing elements. The method may further include reading a programmable data structure designating a pattern for driving the fingerprint sensing elements. The fingerprint sensing elements may then be driven according to the pattern.

It will be readily understood that the components of the present invention, as generally described and illustrated in the Figures herein, may be arranged and designed in a wide variety of different configurations. Thus, the following more detailed description of the embodiments of the systems and methods of the present invention, as represented in the Figures, is not intended to limit the scope of the invention, as claimed, but is merely representative of selected embodiments of the invention.

Some of the functional units or method steps described in this specification may be embodied or implemented as modules. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose of the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment may be included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of apparatus and methods that are consistent with the invention as claimed herein.

Referring to FIG. 1, in selected embodiments, a fingerprint sensor 10 useable with an apparatus and method in accordance with the invention may include a fingerprint sensing area 12 to provide a surface onto which a user can swipe a fingerprint. A dotted outline of a finger 14 is shown superimposed over the fingerprint sensing area 12 to provide a general idea of the size and scale of one embodiment of a fingerprint sensing area 12. The size and shape of the fingerprint sensing area 12 may vary, as needed, to accommodate different applications.

In certain embodiments, the fingerprint sensing area 12 may include an array of transmitting elements 16, such as a linear array of transmitting elements 16, to assist in scanning lines of "pixels" as a fingerprint is swiped across the fingerprint sensing area 12. In this embodiment, the transmitting elements 16 are shown as a linear array of conductive traces 16 connected to a fingerprint sensing circuit 18. The transmitting elements 16 are not drawn to scale and may include several hundred transmitting elements 16 arranged across the width of a fingerprint, one transmitting element 16 per pixel. A fingerprint image may be generated by scanning successive lines of pixels as a finger is swiped over the array. These lines may then be assembled to generate a fingerprint image, similar to the way a fax image is generated using line-by-line scanning.

In certain embodiments, the transmitting elements 16 are configured to sequentially emit, or burst, a probing signal, one after the other. As will be explained in more detail hereafter, the probing signal may include a burst of probing pulses, such as a burst of square waves. This probing signal may be sensed on the receiving end by a receiving element 20. Like the transmitting elements 16, the receiving element 20 is shown as a conductive trace 20 connected to the fingerprint sensing circuit 18. Although shown as a single receiving element 20, in other embodiments, pairs of receiving elements 20 may be used to differentially cancel out noise.

At the receiving element 20, a response signal may be generated in response to the probing signal. The magnitude of the response signal may depend on factors such as whether a finger is present over the fingerprint sensing area 12 and, more particularly, whether a ridge or valley of a fingerprint is immediately over the gap 22 between a transmitting element 16 and the receiving element 20. The magnitude of the signal generated at the receiving element 20 may be directly related to the RF impedance of a finger ridge or valley placed over the gap 22 between the corresponding transmitting element 16 and receiving element 20.

By using a single receiving element 20 (or a small number of receiving elements 20) and a comparatively larger number of transmitting elements 16, a receiver that is coupled to the receiving element 20 may be designed to be very high quality and with a much better dynamic range than would be possible using an array of multiple receiving elements. This design differs from many conventional fingerprint sensors, which may employ a single large transmitting element with a large array of receiving elements and receivers. Nevertheless, the apparatus and methods described herein are not limited to the illustrated transmitter and receiver design. Indeed, the apparatus and methods disclosed herein may be used with fingerprint sensors using a small number of transmitting elements and a relatively large number of receiving elements, a large number of transmitting elements and a relatively small number of receiving element, or a roughly equal number of transmitting and receiving elements.

As shown in FIG. 1, the fingerprint sensing area 12 (including the transmitting and receiving elements 16, 20) may be physically decoupled from the fingerprint sensing circuit 18. Positioning the sensing elements 16, 20 off the silicon die may improve the reliability of the fingerprint sensor 10 by reducing the sensor's susceptibility to electrostatic discharge, wear, and breakage. This may also allow the cost of the sensor 10 to be reduced over time by following a traditional die-shrink roadmap. This configuration provides a distinct advantage over direct contact sensors (sensors that are integrated onto the silicon die) which cannot be shrunk to less than the width of an industry standard fingerprint. Nevertheless, the apparatus and methods disclosed herein are applicable to fingerprint sensors with sensing elements that are located either on or off the silicon die.

In certain embodiments in accordance with the invention, a second array of transmitting elements 24 may be provided adjacent to the first array of transmitting elements 16. This second array of transmitting elements 24 may communicate with a second receiving element 26, which may, in certain embodiments, electrically connect to the first receiving element 20, as shown in FIG. 1. In certain embodiments, the second array of transmitting elements 24 may be used in combination with the first array of transmitting elements 16 to determine the velocity of a finger as it is swiped over the fingerprint sensing area 12. That is, lines of fingerprint data scanned by the second array may be compared to lines of fingerprint data scanned by the first array to determine the velocity of the finger. This velocity measurement may be important to generate an accurate non-distorted fingerprint image.

Figure 2:
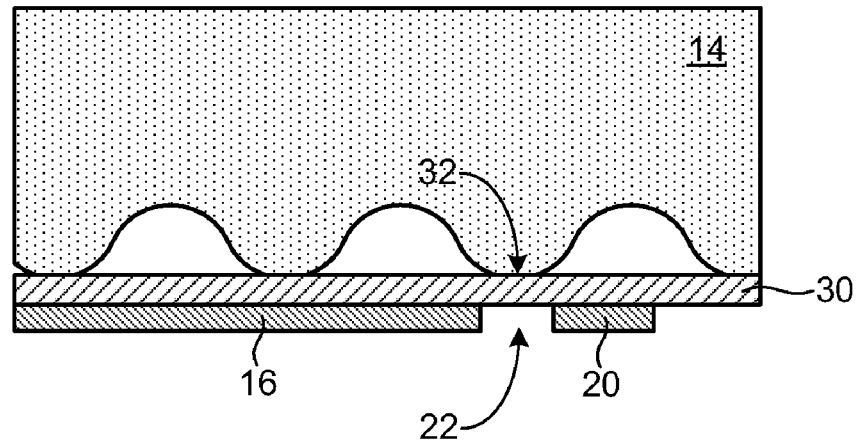
FIG. 2 is a partial cutaway profile view of a fingerprint sensing area showing the interaction between a finger and fingerprint sensing elements in a capacitive-type fingerprint sensor, with a fingerprint ridge lying substantially over the sensor gap.
Figure 3:
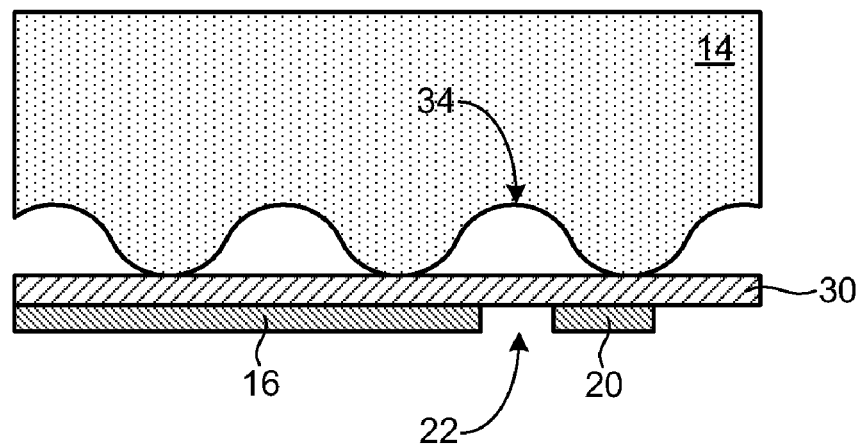
FIG. 3 is a partial cutaway profile view of a fingerprint sensing area showing the interaction between a finger and fingerprint sensing elements in a capacitive-type fingerprint sensor, with a fingerprint valley lying substantially over the sensor gap.

Referring generally to FIGS. 2 and 3, in selected embodiments, the transmitting and receiving elements 16, 20 discussed above may be adhered to a non-conductive substrate 30. For example, the substrate 30 may be constructed of a flexible polyimide material marketed under the trade name Kapton® and with a thickness of between about 25 and 100 μm. The Kapton® polymer may allow the fingerprint sensor 10 to be applied to products such as touchpads and molded plastics having a variety of shapes and contours while providing exceptional durability and reliability.

In selected embodiments, a user's finger may be swiped across the side of the substrate 30 opposite the transmitting and receiving elements 16, 20. Thus, the substrate 30 may electrically and mechanically isolates a user's finger from the transmitting element 16 and receiving element 20, thereby providing some degree of protection from electrostatic discharge (ESD) and mechanical abrasion.

The capacitive coupling between the transmitting element 16 and the receiving element 20 may change depending on whether a fingerprint ridge or valley is immediately over the gap 22. This is because the dielectric constant of a finger is typically ten to twenty times greater than the dielectric constant of air. The dielectric constant of the ridges of a finger may vary significantly from finger to finger and person to person, explaining the significant range of dielectric constants. Because a fingerprint ridge has a dielectric constant that differs significantly from that of air, the capacitive coupling between the transmitting element 16 and receiving element 20 may vary significantly depending on whether a ridge or valley is present over the sensor gap 22.

For example, referring to FIG. 2, when a fingerprint ridge 32 is over the gap 22, the capacitive coupling between the transmitting element 16 and receiving element 20 may be increased such that the probing signal emitted by the transmitting element 16 is detected at the receiving element 20 as a stronger response signal. It follows that a stronger response signal at the receiving element 20 indicates the presence of a ridge 32 over the gap 22. On the other hand, as shown in FIG. 3, the capacitive coupling between the transmitting element 16 and receiving element 20 may decrease when a valley is present over the gap 22. Thus, a weaker response signal at the receiving element 20 may indicate that a valley 34 is over the gap 22. By measuring the magnitude of the response signal at the receiving element 20, ridges and valleys may be detected as a user swipes his or her finger across the sensing area 12, allowing a fingerprint image to be generated.

Figure 4:
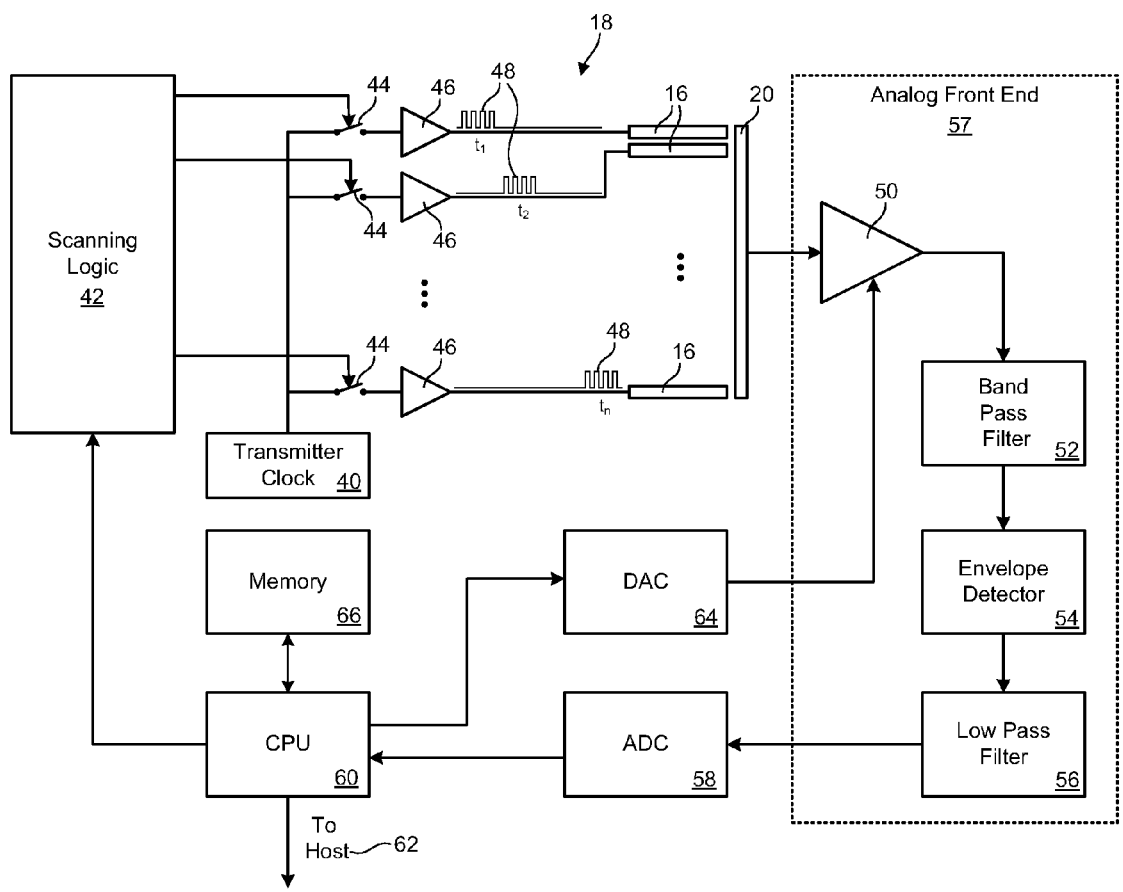
FIG. 4 is a high-level block diagram of one embodiment of a fingerprint sensing circuit for use with the present invention.

Referring to FIG. 4, in certain embodiments, a fingerprint sensing circuit 18 useable with an apparatus and method in accordance with the invention may include a transmitter clock 40 configured to generate an oscillating signal, such as an oscillating square-wave signal. Scanning logic 42 may be used to sequentially route the oscillating signal to buffer amplifiers 46, one after the other, using switches 44. The buffer amplifiers 46 may amplify the oscillating signal to generate the probing signal. As shown, the buffer amplifiers 46 may sequentially burst the probing signal 48 to each of the transmitting elements 16, one after the other. A response signal, generated in response to the probing signal 48, may be sensed at the receiving element 20 and may be routed to a variable-gain amplifier 50 to amplify the response signal. The amplified response signal may then be passed to a band pass filter 52 centered at the frequency of the transmitter clock 40.

The output from the band pass filter 52 may then be supplied to an envelope detector 54, which may detect the envelope of the response signal. This envelope may provide a baseband signal, the amplitude of which may vary depending on whether a ridge or valley is over the sensor gap 22. The baseband signal may be passed to a low pass filter 56 to remove unwanted higher frequencies. The variable-gain amplifier 50, band pass filter 52, envelope detector 54, low pass filter 56, as well as other analog components may be collectively referred to as an analog front end 57.

The output from the low pass filter 56 may be passed to an analog-to-digital converter (ADC) 58, which may convert the analog output to a digital value. The ADC 58 may have, for example, a resolution of 8 to 12 bits and may be capable of resolving the output of the low pass filter 56 to 256 to 4096 values. The magnitude of the digital value may be proportional to the signal strength measured at the receiving element 20. Likewise, as explained above, the signal strength may be related to the capacitive coupling between the transmitting element 16 and receiving element 20, which may depend on the RF impedance of the feature over the sensor gap 22.

The resulting digital value may be passed to a CPU 60 or other digital components (e.g., memory 66), which may eventually pass digital fingerprint data to a host system 62. The host system 62, in selected embodiments, may process the fingerprint data using various matching algorithms in order to authenticate a user's fingerprint.

In addition to processing the digital data, the CPU 60 may control the gain of the variable-gain amplifier 50 using a digital-to-analog converter (DAC) 64. The gain may be adjusted to provide a desired output power or amplitude in the presence of variable sensing conditions. For example, in selected embodiments, the gain of the variable-gain amplifier 50 may be adjusted to compensate for variations in the impedance of different fingers. In selected embodiments, the CPU 60 may also control the operation of the scanning logic 42.

Figure 5:
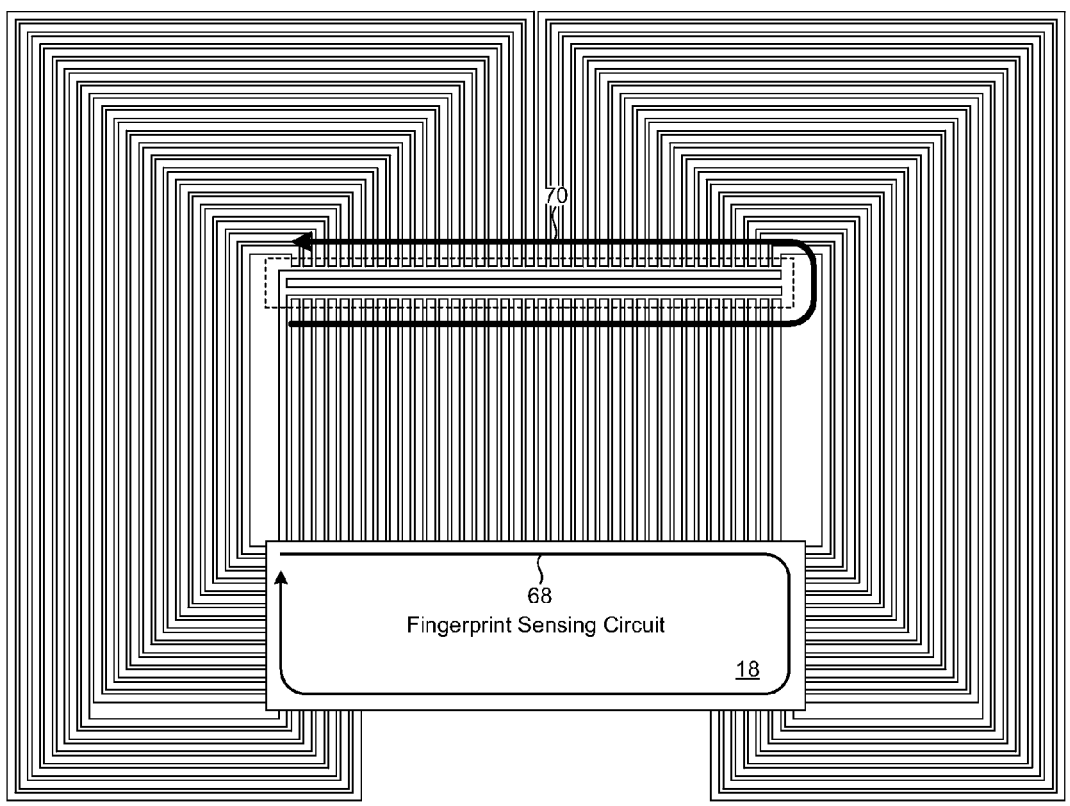
FIG. 5 is a high-level block diagram showing one embodiment of a pattern for driving the I/O interconnects and "pixels" of a fingerprint sensing circuit.

Referring to FIG. 5, while continuing to refer generally to FIG. 1, in selected embodiments, the interconnects that are used to connect the fingerprint sensing circuit 18 to the transmitting elements 16 may be configured to drive the transmitting elements 16 in a particular order. For example, if the order begins with the interconnect at the upper left-hand corner of the fingerprint sensing circuit 18 and then follows a generally clock-wise path 68 around the fingerprint sensing circuit 18, the transmitting elements 16, 24 may be driven in a sensing pattern 70. That is the first array of transmitting elements 16 may be driven in a rightward direction, after which the second array of transmitting elements 24 may be driven in a leftward direction. Although effective, this sensing pattern 70 is not optimal for sensing fingerprints due to the motion of the user's finger.

Figure 6:
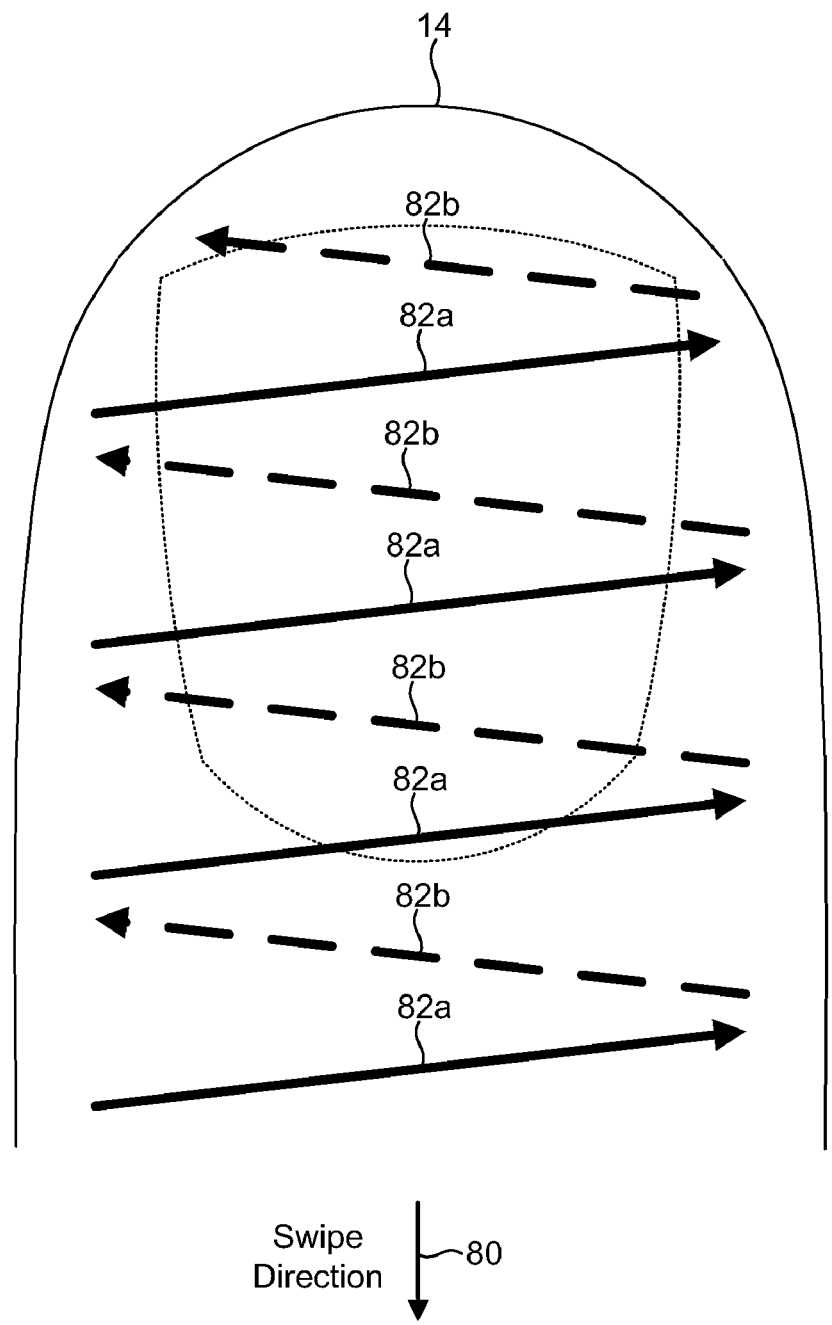
FIG. 6 is a diagram showing one embodiment of a finger scanning pattern resulting from the pattern of FIG. 5.

For example, referring to FIG. 6, while continuing to refer to FIGS. 1 and 5, when scanning a fingerprint, a user may swipe his or her finger 14 across the fingerprint sensing area 12 in a direction 80. Because the finger 14 is moving while it is being scanned, the acquired scan lines may be represented as slanted lines 82a, 82b across the user's finger. That is, the movement of the finger 14 combined with the rightward or leftward driving direction of the transmitting elements 16, 24 may generate scan lines 82a, 82b that are not aligned across the width of the finger (perpendicular to the swipe direction 80), but rather are slanted in one of two directions. The angles of the slanted scan lines 82a, 82b are exaggerated for illustration purposes.

For example, when a first array of transmitting elements 16 is scanning in a rightward direction, as shown in FIG. 5, scan lines 82a generated by the first array may be slanted upward to the right. Similarly, when a second array of transmitting elements 24 are scanning in a leftward direction, scan lines 82b generated by the second array may be slanted upward to the left. Thus, the scanning pattern 70 illustrated in FIG. 5 may generate scan lines 82a, 82b that are slanted in opposite directions. This scanning pattern 70 may be non-ideal where two lines are scanned and compared to one another to determine finger velocity. Ideally, the scan lines 82a, 82b would be parallel or as close to parallel as possible.

Figure 7:
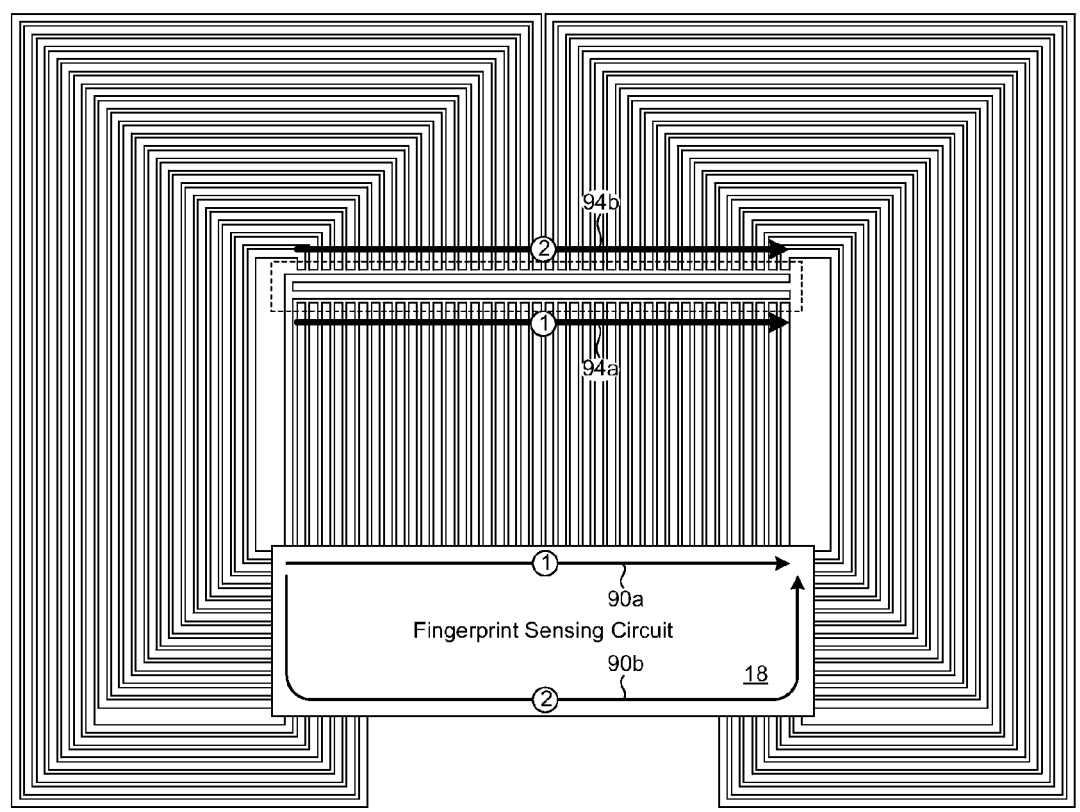
FIG. 7 is a high-level block diagram showing an alternative embodiment of a pattern for driving the I/O interconnects and "pixels" of a fingerprint sensing circuit.

Referring to FIG. 7, in certain embodiments, it may advantageous to provide a fingerprint sensing circuit 18 that can drive the transmitting elements 16, 24 in an order modifiable through programming or other means. For example, if the order illustrated in FIG. 5 could be modified such that it begins with the interconnect at the upper left-hand corner of the fingerprint sensing circuit 18 and proceeds in a rightward direction (as indicated by the path 90a) and then returns to the upper left-hand corner and proceeds in a counter-clock-wise direction (as indicated by the path 90b), the transmitting elements 16, 24 may be driven in an improved sensing pattern 94a, 94b. Specifically, the first array of transmitting elements 16 may be driven in a rightward direction (as indicated by the path 94a), after which the second array of transmitting elements 24 may also be driven in a rightward direction (as indicated by the path 94b).

Figure 8:
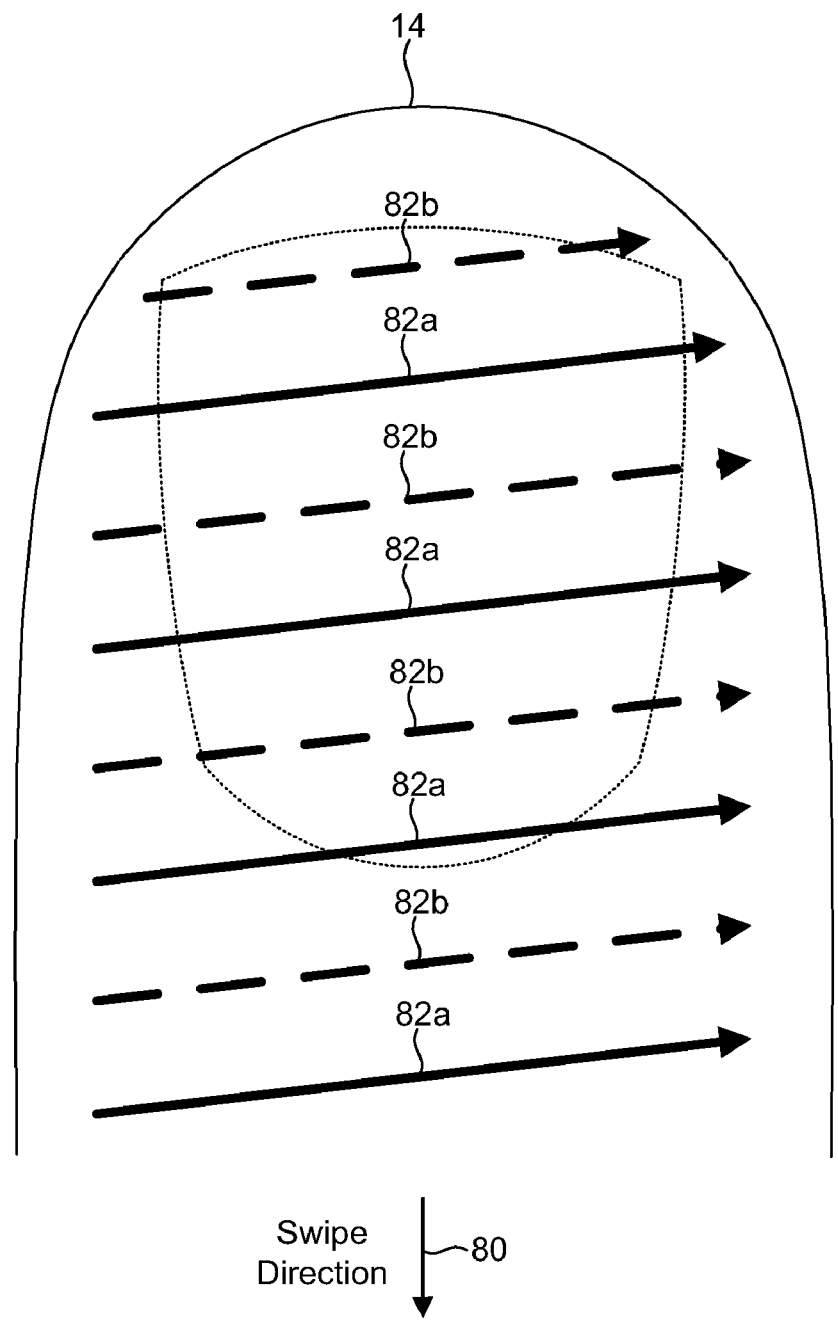
FIG. 8 is a diagram showing a finger scanning pattern resulting from the pattern of FIG. 7.

For example, referring to FIG. 8, while continuing to refer to FIGS. 1 and 7, when a user swipes his or her finger across the fingerprint sensing area 12 in a direction 80, the acquired scan lines 82a, 82b may be slanted in the same direction, as opposed to opposite directions. Specifically, as the first array of transmitting elements 16 scans in a rightward direction 94a, as shown in FIG. 7, the acquired scan lines 82a may be slanted upward to the right. Similarly, when the second array of transmitting elements 24 scans in a rightward direction 94b, the acquired scan lines 82b may also be slanted upward to the right. This generates scan lines 82a, 82b that are substantially parallel to one another, facilitating the comparing of the lines 82a, 82b for velocity sensing purposes.

Figure 9:
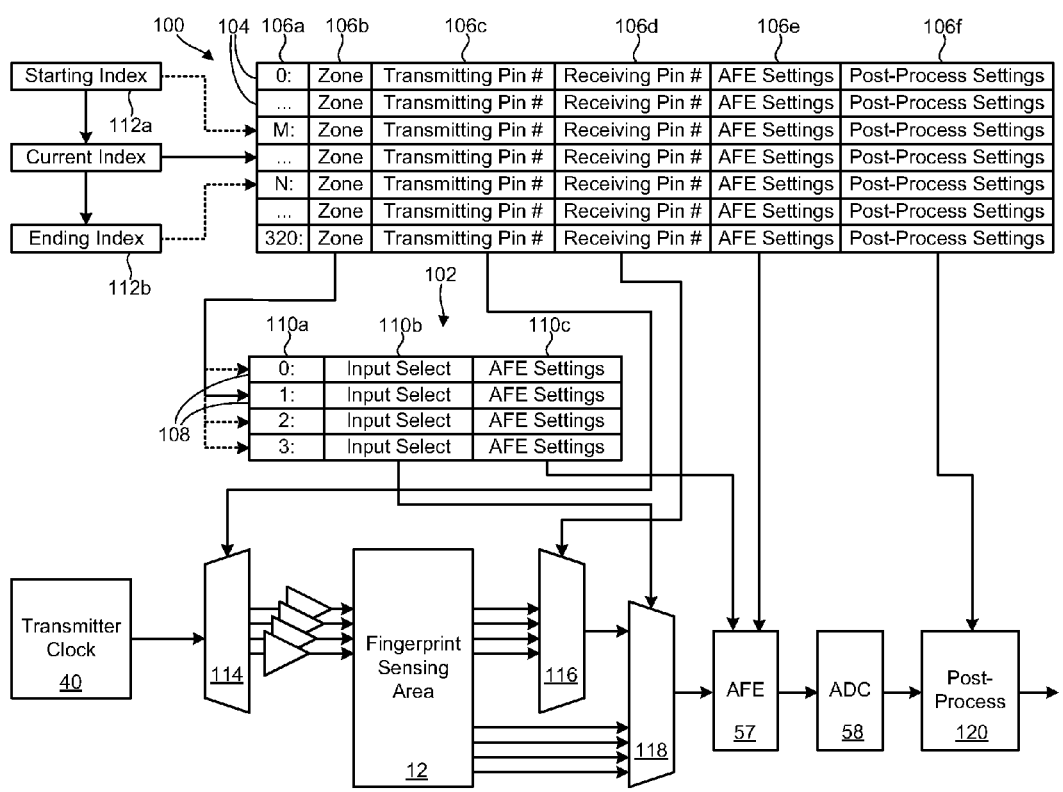
FIG. 9 is a high-level block diagram showing one embodiment of a programmable data structure, in this example several tables, which may be used to designate a sensing pattern.

Referring to FIG. 9, in selected embodiments in accordance with the invention, a data structure 100, 102 may be stored in memory 66 (e.g., RAM, ROM, PROM, EPROM, etc.) of the fingerprint sensing circuit 18 to designate a sensing pattern for driving the transmitting elements 16, 24 and receiving elements 20, 26. In certain embodiments, this data structure 100, 102 may be programmed to set or alter the sensing pattern, or may be programmed to contain several different sensing patterns, one or more of which may be selected. As shown in FIG. 9, the data structure 100, 102 is provided in the form of one or more tables 100, 102. However, the data structure 100, 102 is not limited to any specific form or structure, but may include, for example, tables, files, character strings, numeric values, arrays, or the like. Alternatively, the sensing pattern may be programmed with a field programmable gate array or other programmable logic. In this embodiment, the programmable data structure would be deemed to include programming information for logic gates or other programmable logic blocks.

Where tables 100, 102 are used as the data structure 100, 102, in certain embodiments, the tables 100, 102 may include a timeslot table 100 and a zone configuration table 102. The timeslot table 100 may include entries 104, each represented by a row 104 in the table 100. Each row 104 may correspond to a different "timeslot." For the purposes of this disclosure, a "timeslot" may refer to the time that is allocated to each "pixel" of the fingerprint sensor 10 when scanning a fingerprint. In the illustrated example, a timeslot may refer to the time that is allocated to each transmitting element 16, 24 as it emits the probing signal.

In certain embodiments, the timeslot table 100 may include multiple columns 106, providing fields for each of the entries 104. For example, the timeslot table 100 may include columns to store an index 106a, a zone 106b, a transmitting pin number 106c, a receiving pin number 106d, analog front end settings 106e, and post-process settings 106f for each of the entries 104. In certain embodiments, the index 106a is provided to uniquely identify a timeslot. In certain embodiments, the fingerprint sensing circuit 18 may be configured to step from one timeslot to another in the order of the indices 106a, as will be explained in more detail hereafter.

In certain embodiments, each of the entries 104 may identify a transmitting pin number 106c, which may identify which pin (or interconnect) of the fingerprint sensing circuit 18 is used to transmit the probing signal during the respective timeslot. Similarly, the entries 104 may identify a receiving pin number 106d to identify which pin (or interconnect) is used to sense (or receive) during the same timeslot. In selected embodiments, the fingerprint sensing circuit 18 may be configured such that various of the interconnects may be used for either transmitting or receiving purposes, thereby increasing the flexibility of the circuit 18 and enabling various different sensing patterns.

Each of the entries 104 may also include analog-front-end setting 106e, which may identify settings such as gain or filter settings associated with the analog portion 57 of the fingerprint sensing circuit 18 and associated with the timeslot. These settings 106e may be important, for example, if the fingerprint sensor 10 is being used for different applications, such as fingerprint sensing, calibration, or for tasks such as navigation (e.g., the fingerprint sensor doubles as a navigation device such as a touchpad). The entries 104 may also include post-process settings 106f associated with the digital portion of the circuit 18. These post-process settings 106f may, for example, identify how many bits are used to represent data from each pixel, or settings such as whether a pixel is used for velocity sensing or fingerprint sensing purposes, or whether a pixel is used in association with culling redundant fingerprint data.

In selected embodiments, a zone column 106b may identify a zone associated with a timeslot. Because groups of pixels may be used for the same purpose (e.g., fingerprint sensing, velocity sensing, calibration, navigation, etc.), groups of pixels may share common settings. A zone configuration table 102, containing zone entries 108, may identify settings that are common to groups, or "zones," of pixels such that the settings do not have to be stored for each individual pixel, or timeslot 104. This can significantly reduce the amount of memory that is required to store settings for each individual pixel. Thus, by identifying a zone 106b, a timeslot entry 104 may be assigned settings that are common to the zone.

In certain embodiments, zone entries 108 may include an index field 110a, uniquely identifying a zone, an input select field 110b, and an analog-front-end settings field 110c, among other fields. In selected embodiments, an input select field 110b may identify an interconnect used as an input for the zone. This input may include a dedicated interconnect (an interconnect used only for receiving) or an interconnect that can be used for either transmitting or receiving. Similarly, analog-front-end settings 110c may identify analog settings that are common to the zone.

In operation, a sensing pattern may be defined by a starting index 112a and an ending index 112b in the timeslot table 100. The control logic of the fingerprint sensing circuit 18 may step through the indices 106a, beginning with the starting index 112a and terminating with the ending index 112b. As the control logic steps through the indices 106a, a demultiplexer 114 may route the probing signal (from the transmitter clock 40) to the transmitting pin 106c identified in the timeslot table 100. This will drive the transmitting element 16, 24 connected to the transmitting pin 106c. This probing signal may be detected (in the form of a response signal) by a receiver element 20, 26 identified in the timeslot table 100 and selected by a multiplexer 116. In certain embodiments, the probing signal may be detected by a receiving element 20 coupled to a dedicated analog input, as discussed previously. The input select 110b may be coupled to a multiplexer 118 to select whether a dedicated or non-dedicated interconnect is used for receiving the probing signal.

The resulting response signal may be routed to the analog-front-end 57. The analog-front-end 57 may be tuned and adjusted according to the analog-front-end settings 106e, 110c stored in the timeslot table 100 and/or zone configuration table 102. The output from the AFE 57 may then be passed to the ADC 58, where it may be converted to a digital value. The resulting digital value may be processed according to the post-process settings 106f stored in the timeslot table 100.

The programmable data structure, one embodiment of which is illustrated in FIG. 9, is not limited to the fingerprint sensing circuit 18 nor the fingerprints sensing patterns illustrated herein. Indeed, the data structure may be used to impart greater flexibility to a wide variety of different fingerprint-sensing technologies, including capacitive, optical, and ultrasonic sensors. Each of these technologies may benefit from having programmable interconnects and/or programmable sequences for driving the interconnects.

One advantage of the present invention becomes apparent in cases where the fingerprint sensing area 12 and the fingerprint sensing circuit 18 are developed somewhat independently. In such cases, the geometry of the fingerprint sensing area 12, including the placement of the transmitting and receiving elements 16, 20, 24, 26 and the sequence for driving them, may not be fully known at the time the fingerprint sensing circuit 18 is developed. By making the interconnects and the sequence for driving the interconnects programmable, the fingerprint sensing circuit 18 may be developed and then programmed once the geometry of the fingerprint sensing area 12 is known.

Another advantage of the present invention is that different sensing patterns may be stored concurrently in the programmable data structure. For example, different sensing patterns may be used for fingerprint sensing, velocity sensing, calibration, or navigation purposes. Each of these patterns may be stored in different index ranges of the data structure. By properly selecting the starting and ending indices 112a, 112b, the fingerprint sensing area 12 may implement different sensing patterns without the need to reprogram the data structure.

The invention may be embodied in other specific forms without departing from its spirit or essential characteristics. The described examples are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A fingerprint sensor providing programmable sensing patterns, the fingerprint sensor comprising:
    a fingerprint sensing circuit comprising a plurality of I/O interconnects, the I/O interconnects configured to sequentially drive a plurality of fingerprint sensing elements;
    a memory device operably coupled to the fingerprint sensing circuit;
    at least one programmable table stored in the memory device to designate a pattern for driving the fingerprint sensing elements; and
    the fingerprint sensing circuit further configured to drive the fingerprint sensing elements according to the pattern.

2. The fingerprint sensor of claim 1, wherein the fingerprint sensing elements comprise at least one of transmitting elements and receiving elements.

3. The fingerprint sensor of claim 1, wherein the programmable data structure comprises entries, each entry associated with a timeslot in the pattern.

4. The fingerprint sensor of claim 3, wherein each entry identifies an I/O interconnect used for transmitting.

5. The fingerprint sensor of claim 3, wherein each entry identifies an I/O interconnect used for receiving.

6. The fingerprint sensor of claim 3, wherein each entry identifies analog settings associated with a corresponding timeslot.

7. The fingerprint sensor of claim 3, wherein each entry identifies digital settings associated with a corresponding timeslot.

8. The fingerprint sensor of claim 3, wherein each entry includes an index uniquely identifying the entry.

9. The fingerprint sensor of claim 3, wherein each entry identifies a zone associated with the corresponding timeslot, the zone identifying settings to be used with all entries associated with the zone.

10. The fingerprint sensor of claim 1, wherein the data structure is configured to concurrently store multiple patterns for driving the fingerprint sensing elements.

11. A method for programming a fingerprint sensor with different sensing patterns, the method comprising:
    providing a fingerprint sensing circuit comprising a plurality of I/O interconnects, the I/O interconnects configured to sequentially drive a plurality of fingerprint sensing elements;
    reading at least one programmable table designating a pattern for driving the fingerprint sensing elements; and
    driving the plurality of fingerprint sensing elements according to the pattern.

12. The method of claim 11, wherein driving the plurality of fingerprint sensing elements comprises driving at least one of transmitting elements and receiving elements.

13. The method of claim 11, wherein reading at least one programmable table comprises reading entries, each entry associated with a timeslot in the pattern.

14. The method of claim 13, wherein reading an entry comprises identifying an I/O interconnect used for transmitting.

15. The method of claim 13, wherein reading an entry comprises identifying an I/O interconnect used for receiving.

16. The method of claim 13, wherein reading an entry comprises identifying analog settings associated with a corresponding timeslot.

17. The method of claim 13, wherein reading an entry comprises identifying digital settings associated with a corresponding timeslot.

18. The method of claim 13, wherein reading an entry comprises reading an index uniquely identifying the entry.

19. The method of claim 13, wherein reading an entry comprises reading a zone associated with the corresponding timeslot, the zone identifying settings to be used with all entries associated with the zone.

20. The method of claim 11, wherein reading a programmable data structure comprises reading at least one of a table, a file, a character string, a numeric value, and an array.

* * * * *